Feb. 26, 1952 — E. WITTLIN — 2,586,896
MACHINE FOR DIE-CASTING AND INJECTION MOLDING
Filed March 23, 1949 — 3 Sheets-Sheet 1

INVENTOR.
Emanuel Wittlin
BY Thiess, Olson & Mecklenburger
Attys

Feb. 26, 1952 E. WITTLIN 2,586,896
MACHINE FOR DIE-CASTING AND INJECTION MOLDING
Filed March 23, 1949 3 Sheets-Sheet 2

INVENTOR.
Emanuel Wittlin
BY
Thiess, Olson & Mecklenburger
Attys

Patented Feb. 26, 1952

2,586,896

UNITED STATES PATENT OFFICE 2,586,896

MACHINE FOR DIE-CASTING AND INJECTION MOLDING

Emanuel Wittlin, Chicago, Ill.

Application March 23, 1949, Serial No. 83,020

3 Claims. (Cl. 22—92)

This invention relates to a die-casting or injection-molding machine and has as an object the provision of an improved implement for the mass production of articles of metallic or other fusible or plasticizable materials.

Another object of this invention is to provide a mechanism for alternately opening and closing a die or mold, and for securing the movable die or mold section in its closed position. This mechanism constitutes the heart of a die-casting or of an injection-molding machine and may be combined with any suitable known motive means and any suitable known means for injecting under pressure a substance to be cast or molded into a desired shape.

According to this invention, the die or mold is closed under relatively light pressure and then passively locked in closed position. Numerous features will be described herein in connection with the design and control of the locking means which result in a simple and reliable machine, flexible in use and economical in construction and operation.

In existing machines, the operating mechanisms follow, in basic concept, three main patterns: the link or toggle arrangement, the cam movement, and the direct ram action.

Link or toggle mechanisms are complex, require great precision in construction, fine adjustment in service and extensive maintenance. They subject the essential parts of the machine itself as well as the die or mold assembly to strains and stresses far in excess of those engendered by the injection. Separation of the die or mold sections by the pressure of the injected material against the walls of the cavities is opposed by structures of considerable length whose total "give" under stress affects adversely the dimensional accuracy of the product. Their opening stroke is rigidly established, and cannot be varied in accordance with different depths of impressions in dies run successively.

Cam movements also necessitate accurate fitting and adjusting, while excessive friction between vital parts occasions rapid deterioration and high power consumption.

Machines with direct action drive either contain the pressure of the injected material within the cavities by sheer power or are equipped with separate locking devices wherein the locking members execute motions in directions or in planes perpendicular to or substantially at right angles with the travel of the movable machine platen or with the direction of the closing motion of the die section or sections which they serve to lock in closed position. Such locks require very close fitting when actuated by cam movements, while those operated by subsidiary motive means add materially to the complexity and to the bulk of the machine and to its power consumption, yet afford only a very slim margin for imprecision in adjusting the machine to the length of the individual die assembly.

It is another object of this invention to provide an improved implement for the production of die-castings or of injection-molded articles by correcting the shortcomings to be found, as pointed out above, in machinery heretofore available for that purpose and by thus imparting to a novel machine, concurrently, such advantageous characteristics as utmost simplicity and economy in construction and operation, ability to turn out articles of superior dimensional accuracy across parting line, ready adaptability to individual job requirements, self-adjustment within wide limits, long wear of all parts of mechanism and good conservation of dies, reduced maintenance, easy accessibility and quick repair of all parts, and facility of die installation.

It is another object of this invention to provide an improved die-casting or injection-molding machine locking mechanism operating without great stresses, without close fitting or adjusting and without separate motive means.

It is another object of this invention to provide an improved die-casting or injection-molding machine construction permitting the use of a simple, sturdy and long-wearing framework for holding the die halves.

It is another object of this invention to provide an improved die-casting or injection-molding machine which permits closing and locking of the die or mold under relatively light pressure thereby eliminating one major cause of machine and of die failure.

It is another object of this invention to provide an improved locking means for a die-casting or an injection-molding machine permitting the die halves to be securely locked in their closed position regardless of fairly substantial misalignment of the machine parts supporting them.

It is another object of this invention to provide an improved die-casting or injection-molding machine in which die alignment is rendered independent of the alignment of the machine parts in a measure sufficient to avert destructive stresses from conflicting alignments.

It is another object of this invention to provide an improved die-casting or injection-molding machine in which a relatively light effort of the motive means suffices to close as well as to open the die.

It is another object of this invention to provide an improved die-casting or injection-welding machine in which a relatively light effort of the motive means suffices to lock as well as to unlock the locking mechanism.

It is another object of this invention to provide an improved die-casting or injection-molding machine in which die assemblies of unequal length may be installed successively without resetting the span between the die-carrying platens in closed position.

It is another object of this invention to provide an improved die-casting or injection-molding machine which permits ready adjusting of the opening stroke to the depth of individual die impressions.

It is another object of this invention to provide an improved die-casting or injection-molding machine which can be altered in little time and at small cost to handle die assemblies of a length beyond the range for which it is normally intended.

It is another object of this invention to provide an improved die-casting or injection-molding machine which is economical to manufacture, operate and maintain while at the same time having the desirable characteristics mentioned above.

The simplicity of the machine as a whole is due to the small number and plain contours of the individual component parts which, except for a few screw threads, bear only plane or cylindrical machined surfaces, few of which require fitting.

Increased dimensional accuracy of the product across the parting line is chiefly the result of the limited effective length of the tie bars, exceeding that of the die assembly only by a fraction, and of the generally short circuit of stresses set up in containing the pressure of the injected material inside the die cavities. A further contributing factor is the absence of a crushing closing force which, in machines of other types, tends to pound flash debris into the die faces.

The self-adjusting feature applies as well to the movable platen as to the locking mechanism proper. It is achieved by combining a small degree of divergence between the directions of the closing motion of the movable platen and the locking motion of the locking members, articulation, play between movable parts, and provisions for equalization of forces. Thus, the locking can take place without ill effect in the presence of variations of the closed position of the movable platen relative to the stationary member of the locking mechanism in excess of two inches. Since the two-inch bracket covers a majority of dies to be run in any individual machine, the need for resetting the machine to fit the length of a particular die assembly arises infrequently.

Long wear is assured in part by the floating mounting of the movable platen and of the sliding structure supporting the primary elements of the locking mechanism, on widely spaced skids. The loosely guided bearing members of those machine parts, while allowing them freedom of self-alignment, also permit considerable wearing down of the bearing surfaces without detriment to the machine or to its function.

This invention, together with further objects and advantages thereof, will best be understood by reference to the following description taken in connection with the accompanying drawings, and its scope will be pointed out in the appended claims.

In the drawings:

Fig. 4 is a detail view of the locking mechanism on the plane represented by the line 4—4 on Fig. 2;

Fig. 5 is a cross-sectional view of the locking mechanism shown in Fig. 4 taken along the line 5—5; and Figure 6 is a diagrammatic illustration of the relationship of certain angularly disposed surfaces pertaining to the locking mechanism.

Figure 1:
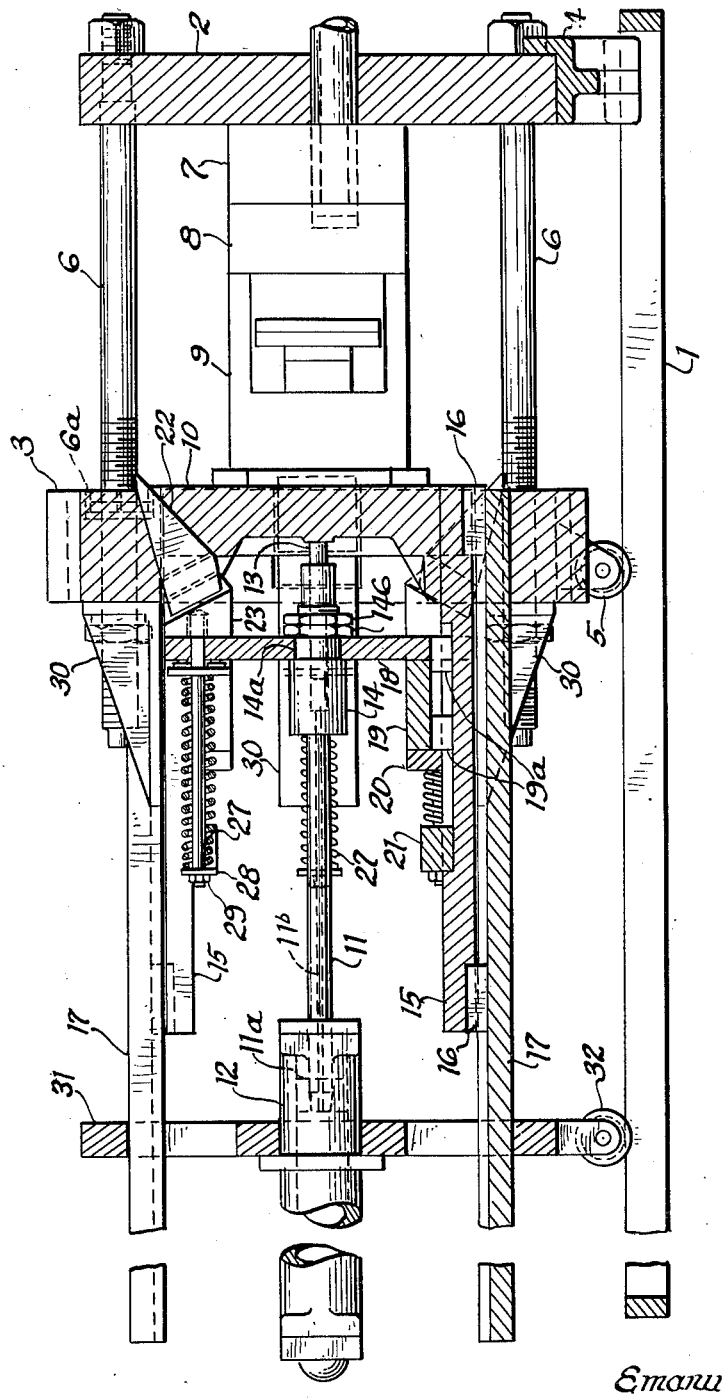
Figure 1 is a longitudinal cross section of a machine constructed in accordance with this invention, this view showing the machine in closed and locked position (the planes of the section being represented by the line 1—1 on Figure 2)

A base frame 1 has mounted thereon a front plate 2 and a locking frame 3. The front plate 2 and locking frame 3 may be mounted on the base frame by any suitable means such as the rigidly secured structure 4 for the front plate and the roller support 5 for the locking frame. Locking frame 3 is preferably movably mounted on the base frame in order that its distance from the front plate may be readily adjusted to accommodate die assemblies of substantially different dimensions. The front plate and the locking frame are held in their proper spaced relationship by tie bars 6.

A cover die 7 representing one of a pair of mating die members is mounted on front plate 2 by any suitable means, not shown. An ejector die 8 and an ejector box or other supporting structure 9, whose assembly represents the complementary die member, are mounted on a sliding plate 10 for longitudinal movement relative to fixed die 7, front plate 2 and locking frame 3, whereby the two mating die members are relatively advanceable toward and retractable from each other between a relative closed or casting position and a relative open or disengaged portion. Movement of sliding plate 10 is controlled by ram 11 and closing cylinder 12, fluid pressure at the left end of piston 11a causing sliding plate 10 to move toward the right and close ejector die 8 against cover die 7. A plunger 13 is interposed between sliding plate 10 and ram 11 and operates in cylinder 14 which forms a part of ram 11 and is fed fluid under pressure through a center bore 11b in the ram. The function of cylinder 14 and plunger 13 will be described subsequently.

Sliding plate 10 is supported by extensions 15 thereto. Fastened to each end of the extensions, there is a sliding plate skid 16 secured to fixed beams 17 in sliding relationship therewith. Skids 16 preferably fit loosely the slideway formed by beams 17 to permit alignment of the dies without setting up stresses through conflict with the alignment of machine parts, which conflict may result from thermal expansion or other factors. It will be noted that the wide spacing between skids on each sliding plate extension 15 results in a very effective support for sliding plate 10.

A lock prism carriage rides between the sliding plate extensions 15 and consists principally of carriage plate 18, extensions 19, carriage skids 19a, and shock plates 20. These members form a rigid structure which slides along sliding plate extensions 15 on skids 19a, being thus associated with the element 10 and the die member 8—9 and slidably connected therewith for longitudinal movement relative thereto alternately in the sense of rapprochement and in that of separation. Movement of the carriage along the sliding plate extensions in that sense of separation (to the left in the drawing) is limited by stops 21 mounted on sliding plate extensions 15 to a distance determined as will be later explained. Shock plates 20 forming a part of the carriage serve to absorb the shock when the carriage strikes stops 21 and thereby to prevent the peening of the ends of extensions 19. Movement of this carriage is also controlled by ram 11 and fluid pressure in closing cylinder 12, the ram being connected to the center portion of carriage plate 18. The connection between ram 11 and plate 18 permits a small degree of independence between those parts. This results from the fact that there is radial clearance between the bore in plate 18 and the reduced portion 14a of the ram head and that plate 18 is held rather loosely between the shoulder of the expanded head of ram 11 and the lock nuts 14b.

Closing cylinder 12 is held in position by rear post 31 which is mounted on base frame 1 on rollers 32. Being mounted on rollers permits the rear post to move with locking frame 3 in resetting for a different die. Also, rear post 31 can be shifted along beams 17 to permit ready installation of a different cylinder.

Rear post 31 is connected to fixed beams 17 by any suitable means, not shown. The closing and opening thrusts are carried by the fixed beams but this force is relatively small since this force is only a fraction of the force required to maintain the die halves closed when material is injected into the die under great pressure. Accordingly, the fixed beams 17 and their connections to locking frame 3 and rear post 31 need not be of the same order of magnitude of strength as the tie bars 6.

Figure 2:
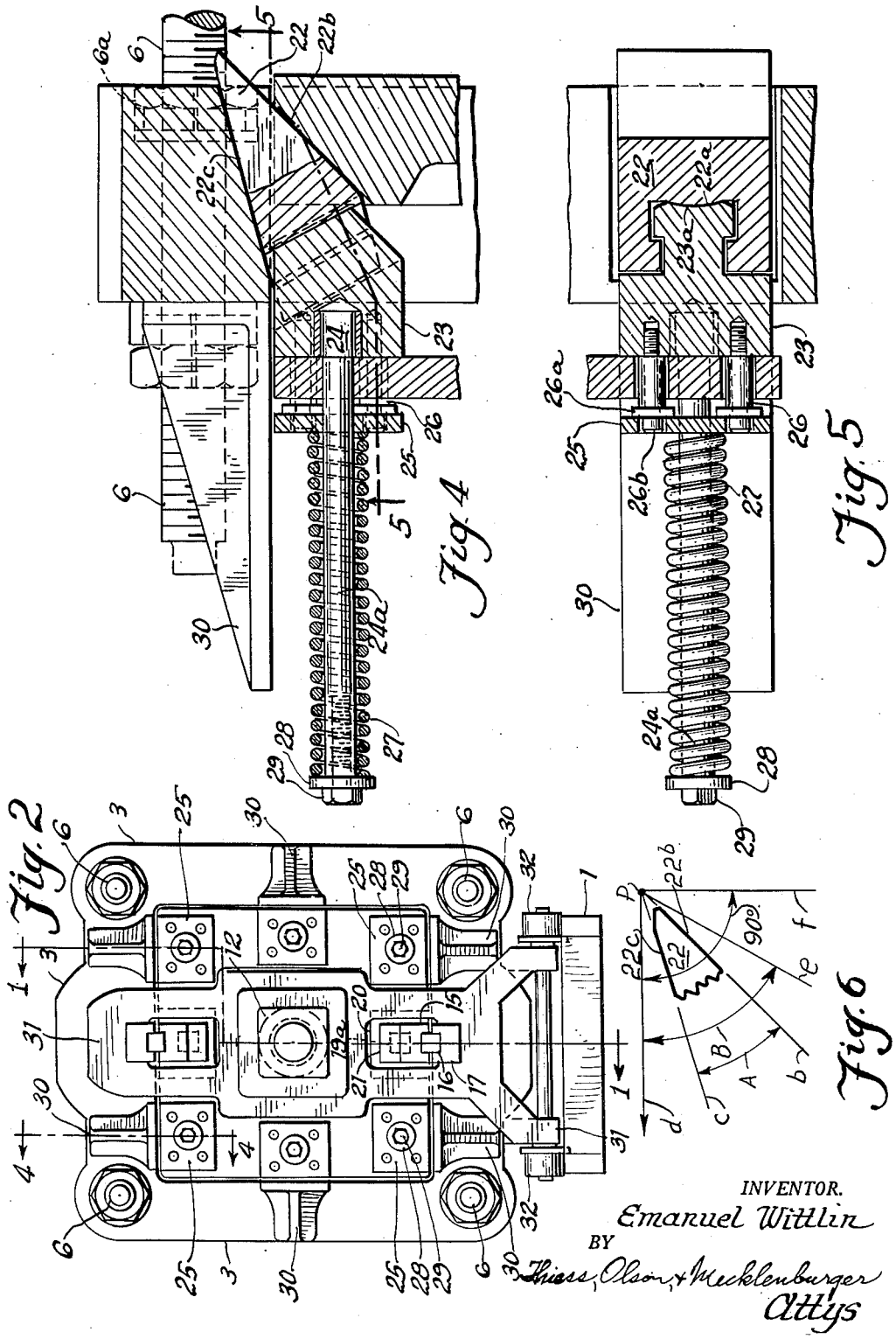
Fig. 2 is an elevational view of the left hand end of the machine as viewed in Figure 1.

The purpose of the lock prism carriage is to support and to control lock prisms or wedges 22. Six such lock prisms are provided in this instance as shown in Fig. 2. They are pointed in the general direction of advance of the die member 8—9 and mounted on drivers 23 by gib connections, best shown in Figs. 4 and 5, in an arrangement wherein a driver and a respective portion of the plate 18 are aligned behind each of them in longitudinal sequence therewith. This connection permits lock prisms 22 to slide inwardly and outwardly with respect to the drivers 23. In the embodiment illustrated, the gibs are inclined at an angle of 60 degrees to the axis of the machine in order to counter the effect of friction.

It will be noted in Fig. 5 that the rear surface 22a of the prism is a cylindrical surface and bears against a complementary concave contact surface 23a on the gib connection of driver 23 facing in the general direction of advance of sliding plate 10 and die member 8—9. This curved surface contact combined with play in the gib connection permits prism 22 to swing slightly with respect to driver 23 and, therefore, to align itself automatically with the dihedral formed by locking frame 3 and sliding plate 10 and insure uniform contact between cooperating surfaces.

Drivers 23 are rotatable on horizontal pivots 24 and are spaced from spring bases 25 by spacers 26 equipped with washers 26a, spacers 26 passing with clearance through openings in carriage plate 18. The spacers are fastened to the drivers by screws 26b. Each spring base 25 is freely movable over stem 24a of pivot 24, and a spring 27 is compressed between the spring base and a washer 28 which is fastened to pivot stem 24a by a screw 29. The length of the spacers 26 between the drivers 23 and the washers 26a equals the thickness of the carriage plate 18 augmented by an appropriate amount of leeway, to be discussed later.

When lock prisms 22 are in the locking position as illustrated in Figs. 1 and 4, the wedge faces 22b and 22c thereof engage locking surfaces on locking frame 3 and sliding plate 10, these locking surfaces preferably being fitted with wear plates, not shown. It will be noted that these locking surfaces on locking frame 3 and sliding plate 10 are paired and that when the sliding plate is moved to the right as in Figs. 1 and 3 the two facing surfaces of each pair define an acute dihedral which faces away from front plate 2 and inwardly toward the axis of the machine. The fact that the wedges are pointed in a forward direction both in and out of engagement results in their being readily movable into locking position with a simple forward movement of the prism carriage, without toggle or cam action.

The small angle which the locking surfaces on the locking frame 3 make with the axis of the machine permits proper operation of the locking mechanism regardless of substantial variation of the closed position of sliding plate 10 with respect to locking frame 3, as will be apparent to those skilled in the art. This is an important feature of the invention as it permits setting of the locking frame 3 at a distance from the front plate 2 as required by the length of a particular die assembly by mere appraisal, without accurate adjusting, and permits the use of the machine with die assemblies differing in length to a considerable extent without resetting locking frame 3 on tie bars 6.

It will be apparent that were the angle to approach a right angle, this latter advantage would be lost. Accordingly, the angle mentioned above must be substantially less than 90°. The locking surfaces on the locking frame 3 and the sliding plate 10 are preferably but not necessarily flat. It will be apparent that one of the locking surfaces must face generally obliquely in the direction of the relative opening motion of the die member with which it is connected. In the embodiment shown in the drawings this is the locking surface or surfaces on the sliding plate 10. The other locking surface may be parallel to the direction of motion of the die members or may face obliquely in the direction of opening motion of the die member to which it is connected.

In the construction shown, the two elements 3 and 10, besides being members of a framework slidably interconnecting the two mating die members represented by the cover die 7 and the ejector die assembly 8—9, embody locking parts pertaining to the locking means proper. These locking parts, which consist in integral portions of the two elements 3 and 10 directly underlying the locking surfaces thereon, are arranged in pairs comprising one locking part on element 3 and a corresponding part on element 10, the two locking parts so paired cooperating with each other and with a corresponding wedge 22 to releasably lock the die members in casting position. The two cooperatively mated locking parts in each such pair are respectively joined with the two die members and are movable bodily therewith relative to each other in the longitudinal sense in regard to the slideway formed by the beams 17, and are so movable between a relative advanced position wherein they are disposed adjacent each other overlapping in that longitudinal sense, as apparent in Figures 1, 3, and 4, and a relative retracted position, not shown, in which they are separated in that sense, such advanced and retracted positions of the locking parts respectively corresponding with the previously mentioned relative casting and disengaged positions of the die members. In association with the die member 8—9 and with its locking parts provided on element 10, the wedges 22 are floatingly mounted by loose connections such as already described respectively adjacent the locking surfaces thereon in generally longitudinal alignment with them and succeeding them in the direction of advance of that die member and its locking parts.

The wedge faces 22b and 22c on the front end of each wedge converge in the general direction of advance of the die member 8—9 and its locking parts at an acute angle to each other and are shaped as portions of surfaces generated by a joint sweep in the sense of the width of the wedge of two obliquely intersecting lines of constant direction, and so disposed in angular relationship to the previously mentioned slideway that any pair of their respective surface elements deriving from an elementary sweep of those generating lines fall within an acute angle which has its apex in the point of intersection of those lines and one leg extending parallel with that slideway in the direction of retraction of the die member 8—9. This arrangement of the wedge faces is diagrammatically shown in Figure 6 wherein b and c are the two intersecting generating lines in any given position along their sweep, intersecting in the point p and forming the acute angle A at which the wedge faces converge, while d is a line extending from the point p parallel with the slideway in the direction of retraction of the die member 8—9 indicated by the arrowhead thereon and representing one leg of the acute angle B whose other leg is the line e and which has its apex in the point p, with the line f, perpendicular to the line d, showing as reference an angle of 90° having the point p as apex. The pair of wedge face elements 22b and 22c shown as heavy portions of the lines b and c fall within the acute angle B.

The respectively corresponding pairs of locking surfaces match the faces of the wedges in shape and orientation so as to be jointly engageable thereby in an intimate face-to-face relationship when the mated locking parts are in relative advanced position.

The rearward thrust on ejector die 8, and hence on sliding plate 10, resulting from the injection into the die of the material to be molded, is borne by lock prisms 22 and locking frame 3, and it will be apparent to those skilled in the art that because of the angular relationship of the lock prism contact surfaces to the locking frame 3 and sliding plate 10, this thrust will be transmitted through the lock prisms to the locking frame, except for a relatively small, residual, rearward thrust tending to force the lock prisms out of locking position.

For this reason, only a small force is required to maintain the lock prisms in locking position, and if desired, the angles may be made such that the residual thrust be entirely contained by friction between the contact surfaces of prisms, locking frame and sliding plate, no force whatsoever being required to brace the prisms against slipping out of locking position.

The angle of the locking surfaces of locking frame 3 and that of the locking surfaces of sliding plate 10 may be varied according to the result desired as to force required to hold the prisms in locking position or force required to withdraw the prisms from that position. This will be understood by those skilled in the art and a treatise on this subject is not required here. In the embodiment shown in the drawings, the angle between the locking surfaces of locking frame 3 and the axis of the machine is 15 degrees while the angle between the locking surfaces of sliding plate 10 and the machine axis is 45 degrees. The angle of the prisms is, accordingly, 30 degrees. This is believed to be a good workable and safe arrangement.

Regardless of the angles employed, fluid pressure should be maintained in closing cylinder 12 during injection, as a safety measure. As a further safety measure, to guard against the danger from a sudden loss of fluid pressure in the closing cylinder during injection, additional means, such as safety catches, for holding the prisms in their locked positions may be employed.

Fastened to the rear of locking frame 3 are a series of guides 30, one for each prism, whose purpose is to prevent the prisms from falling out of drivers 23 and to guide the tips of the prisms into the opening of locking frame 3 during the closing stroke.

Figure 3:
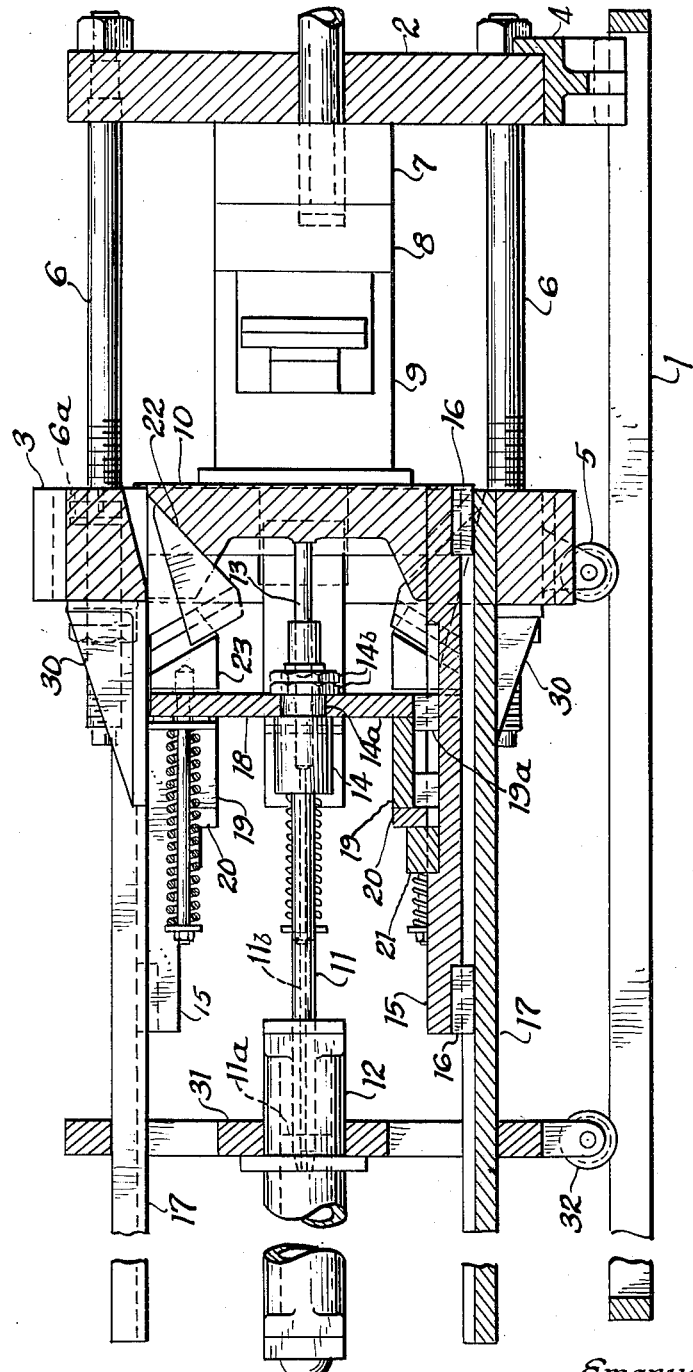
Fig. 3 is a view similar to Fig. 1 showing the same machine in closed but unlocked position.

The operation of the machine illustrated will now be discussed in detail. When the machine is in the open position, sliding plate 10 and sliding plate extensions 15 will be substantially to the left of the position in which they are shown in Figs. 1 and 3. The lock prism carriage will be located with respect to sliding plate 10 as is illustrated in Fig. 3, that is, shock plates 20 will be in contact with stops 21.

Assuming that the previously molded article has been removed from the die and the die is ready for another injection, fluid under pressure is fed into closing cylinder 12. The increased fluid pressure will act against ram 11 and against plunger 13 driving both the sliding plate 10 and the lock prism carriage to the right, shock plates 20 remaining in contact with stops 21 and wedges 22 remaining in their rearward disengaged positions behind the locking surfaces on the sliding plate while being loosely carried forward. This movement continues until the ejector die 8 is in contact with cover die 7, at which point sliding plate 10 can move no farther toward the right. This position is illustrated in Fig. 3.

The fluid pressure in closing cylinder 12 will continue to drive the lock prism carriage to the right, the fluid in cylinder 14 being forced back into the larger cylinder 12, until lock prisms 22 are in their locking position, illustrated in Fig. 1. In this locking operation, the lock prisms move outwardly over the sloping faces of sliding plate 10 and locking frame 3, the prisms moving with respect to drivers 23 by virtue of the gib connections therewith, each shifting transversely of the slideway of beams 17 along the contact surface 23a of its driver which engages its surface 22a in a line substantially parallel with the plane of the pair of lines generating its wedge faces. In view of the fact that prisms 22 can sway about pivots 24 in carriage plate 18 and swing with respect to drivers 23, they are also free to adjust themselves to the proper angle to fit the wedge-shaped openings formed by locking frame 3 and sliding plate 10 in spite of substantial misalignment of pertinent parts.

A further provision is made for insuring proper contact of lock prisms 22 with locking frame 3 and sliding plate 10 in spite of misalignment of those parts, in the form of resilient spacing means respectively associated with each prism or wedge and disposed to the rear of it in engagement therewith and with the member 18 so as to individually yieldingly space the wedges from that member in the general direction of advance of the die member 8—9. Spring 27 normally holds spring base 25, spacers 26, driver 23 and lock prism 22 in a forward position with respect to carriage plate 18 to which the pivot stem 24a is suitably fastened, there being provided some leeway for movement of these enumerated parts with respect to plate 18, as previously explained. When one lock prism comes into firm contact with locking frame 3 and sliding plate 10, this, of course, halts the progress to the right of that prism, driver and spring base. However, plate 18 can continue its movement to the right by an amount equal to the leeway just mentioned. During this progress, plate 18 compresses spring 27. This further movement of plate 18 will seat the remaining prisms.

In order to obtain a firm seating of all the prisms 22, springs 27 are precompressed to such a degree that their aggregate tension approximates the force applied to plate 18 by ram 11 at the conclusion of the locking phase. Because of the considerable length of springs 27, the compression force will not be substantially increased in any one or more springs which are further compressed by movement of plate 18 to the right with respect to the corresponding spring base 25. Because of this, the force applied by ram 11 to plate 18 will always be sufficient to move plate 18 to the right with respect to all of the spring bases 25 and exert a substantially equal force upon all of the lock prisms. When it is desired to open the die, pressure is fed to closing cylinder 12 at the opposite, or right-hand, side of piston 11a. This pulls plate 18 to the left and withdraws prisms 22 from their locking position. It should be noted that the leeway or lost motion between plate 18 and washers 26a and the lost motion in the gib connection between prisms 22 and drivers 23 will permit a slight movement of plate 18 and of drivers 23 to the left before the opening force is transmitted to the seated lock prisms. The resulting percussion at gibs will assist in the withdrawing of the lock prisms in event of friction bond between the surfaces engaged under pressure.

When shock plates 20 contact stops 21, thereby ending the movement of member 18 relative to the sliding plate 10 in the sense of separation at a distance so determined that the wedges 22 may recede behind the respective locking surfaces on the sliding plate until they clear the adjacent contour of the locking frame 3, the now released sliding plate 10 will be moved to the left carrying with it ejector die 8. Accumulated inertia assists in disengaging the casting from the fixed die, making possible the use of a relatively small closing cylinder.

Among the many possible modifications of the above-described embodiment of this invention is the use of hydraulic or other suitable means as an equalizer for applying equal closing pressure to the individual locking prisms, using such means in place of the springs 27 and associated parts. The important consideration which forms a part of this invention is that the prisms have some independence of forward motion in order to permit their proper seating in spite of imperfections or misalignment of machine parts.

The use of the locking mechanism described above makes possible a die-casting or injection-molding machine which is much more flexible in use than the current types of machines. In a machine employing toggle levers, it is necessary that the rear frame member, corresponding most nearly to locking frame 3, be positioned with great exactness with respect to front plate 2. In the machine described above, the locking mechanism will function satisfactorily with the closed position of sliding plate 10 varying within about two inches axially with respect to locking frame 3. This will permit the mounting of die assemblies varying in length within that range without the necessity of resetting locking frame 3 with respect to front plate 2.

Frequently, a die-casting or injection-molding machine is called upon to handle a die which will not pass between tie bars. In the machine described above, the short tie bars 6 are much more easily removed and replaced in installing such a die than the long tie bars of toggle machines. To permit individual removal of tie bars, the tie bar nuts 6a, lodged in recesses of the frame 3, are split longitudinally.

To eject the casting or molded article from the ejector die, resort may be made either to an independent motive means, such as a hydraulic cylinder housed in the ejector box, or, when the particular die permits, to letting stops affixed to the ejector plate strike the lock frame near the end of the opening stroke.

A further example of the flexibility of this machine appears in the adaptable sliding plate travel. The withdrawing stroke can be varied to fit the needs of a particular job in order to achieve economy in power consumption, or a cylinder having an extra long stroke can be substituted in order to handle a job in which the casting or molded article has an unusual depth.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In a mechanism for die-casting and injection-molding machines, a frame having a straight slideway; a member mounted thereon in slidable engagement with said slideway for linear movement relative to said frame in the longitudinal sense in reference to said slideway; a pair of mating die members respectively secured to said frame and to said member in longitudinal alignment with each other, said die members being alternately relatively advanceable toward and retractable from each other in said longitudinal sense between relative casting and disengaged positions; locking means for releasably locking said die members in casting position comprising a pair of cooperatively mated locking parts respectively joined with said die members and relatively movable in regard to each other in said longitudinal sense, said locking parts being relatively movable as aforesaid respectively bodily with said die members between relative advanced and retracted positions respectively corresponding with said relative casting and disengaged positions of said die members, said locking parts being, when in relative advanced position, adjacent each other and overlapping in said longitudinal sense; said locking means further comprising a wedge associated with one of said die members and the locking part thereof and so disposed as to be pointed in the general direction of said relative movement of advance of said last-mentioned die member, said wedge having on its front end a pair of faces converging in the general direction of said relative movement of advance of said last-mentioned die member at an acute angle to each other and shaped as portions of surfaces generated by a joint sweep in the sense of the width of the wedge of two obliquely intersecting straight lines of constant direction, said wedge faces being so disposed in angular relationship to said slideway that any pair of surface elements thereof corresponding to an elementary sweep of said generating lines fall within an acute angle with the point of intersection of said generating lines as apex and one leg extending parallel with said slideway in the direction of said relative movement of retraction of said last-mentioned die member; said mated locking parts each having a locking surface, said locking surfaces respectively matching said wedge faces in shape and orientation and facing each other obliquely when said locking parts are in relative advanced position as aforesaid, thereby forming a pair of locking surfaces engageable by said pair of converging faces of said wedge in face-to-face relationship; said wedge being, in said association with said die member and locking part, floatingly mounted adjacent said locking surface of said locking part of said last-mentioned die member, generally aligned with said locking surface in said longitudinal sense and succeeding it in said direction of relative movement of advance of said last-mentioned die member with which said wedge is associated as aforesaid, said wedge being relatively movable in regard to said die member and locking part thereof which are respectively complementary to said last-mentioned die member and locking part in a line paralleling said slideway bodily with said last-mentioned die member and locking part for the length of travel of said relative movement of said die members, and being further linearly movable relative to both said die members and both said locking parts obliquely in regard to said slideway between a rearward disengaged and a forward locking position, being so movable from disengaged to locking position in the general direction of said relative movement of advance of said die member with which it is associated as aforesaid, said wedge in such locking position engaging said pair of locking surfaces as aforesaid for releasably locking said locking parts and said die members in their aforesaid respective relative advanced and casting positions.

2. In a mechanism according to claim 1, a second member which is slidably associated with said die member and locking part thereof with which said wedge is associated as aforesaid, said second member being disposed behind said wedge in longitudinal sequence therewith, means slidably interconnecting said second member and said last-mentioned locking part for alternate relative movement of rapprochement and separation substantially parallel with said slideway, and means limiting the extent of such separation of said member and locking part to a predetermined distance, said second member having a contact surface facing in the general direction of said relative movement of advance of said last-mentioned locking part, said contact surface being slidably engageable with a complementary surface on said wedge for urging said wedge to locking position as aforesaid incident to said relative movement of rapprochement between said member and locking part, said contact surface being so shaped and arranged as to permit shifting of said wedge relative to said second member transversely of said slideway in a line substantially parallel with the plane of said pair of lines generating said wedge faces; and operating means connected on one side to said second member and on the other side to said locking part which is complementary to said last-mentioned locking part for actuating said die members and said locking means.

3. In a mechanism for die-casting and injection-molding machines, a frame having a straight slideway; a member mounted thereon in slidable engagement with said slideway for linear movement relative to said frame in the longitudinal sense with reference to said slideway; a pair of mating die members respectively secured to said frame and to said member in longitudinal alignment with each other, said die members being alternately relatively advanceable toward and retractable from each other in said longitudinal sense between relative casting and disengaged positions; locking means for releasably locking said die members in casting position comprising locking parts arranged in cooperatively mated pairs, the two mated locking parts in each such pair thereof being respectively joined with said die members and relatively movable in regard to each other in said longitudinal sense respectively bodily with said die members between relative advanced and retracted positions respectively corresponding with said relative casting and disengaged positions of said die members, said locking parts being, when in relative advanced positions, adjacent each and overlapping in said longitudinal sense; said locking means further comprising wedges respectively cooperating with each of said pairs of locking parts, said wedges being associated with one of said die members and the locking parts thereof and so disposed as to be pointed in the general direction of said relative movement of advance of said last-mentioned die member, each of said wedges having on its front end a pair of faces converging in the general direction of said relative movement of advance of said last-mentioned die member at an acute angle to each other and shaped as portions of surfaces generated by a joint sweep in the sense of the width of the wedge of two obliquely intersecting straight lines of constant direction, said wedge faces being so disposed in angular relationship to said slideway that any pair of surface elements thereof corresponding to an elementary sweep of said generating lines fall within an acute angle with the point of intersection of said generating lines as apex and one leg extending parallel with said slideway in the direction of relative movement of retraction of said last-mentioned die member; said locking parts each having a locking surface, the locking surfaces of each of said pairs of mated locking parts respectively matching said converging faces of the corresponding wedge in shape and orientation and facing each other obliquely when said mated locking parts are in relative advanced position as aforesaid, thereby to form a pair of locking surfaces engageable in face-to-face relationship by said pair of faces of said corresponding wedge; said wedges being in said association with said die member and locking part, floatingly mounted each adjacent said locking surface of the respectively corresponding locking part of said last-mentioned die member, generally aligned with said locking surface in said longitudinal sense and succeeding it in said direction of relative movement of advance of said last-mentioned die member, said wedges being relatively movable in regard to said die member and locking parts thereof which are respectively complementary to said last-mentioned die member and locking parts parallel with said slideway bodily with said last-mentioned die member and locking parts for the length of travel of said relative movement of said die members, said wedges being further linearly movable relative to both of said die members and their locking parts obliquely in regard to said slideway between respective rearward disengaged and forward locking positions, being so movable from disengaged to locking position in the general direction of said relative movement of advance of said die member and locking parts with which said wedges are associated as aforesaid, said wedges in such respective locking positions engaging said pairs of locking surfaces as aforesaid for releasably locking said pairs of mated locking parts and said die members in their respective aforesaid relative advanced and casting positions, a second member slidably associated with said die member and locking parts thereof with which said wedges are associated as aforesaid, said second member having portions respectively aligned behind each of said wedges in longitudinal sequence therewith; means slidably connecting said second member to said locking parts of said last-mentioned die member for alternate relative movement of rapprochement and separation substantially parallel with said slideway, means limiting the extent of such separation of said last-mentioned member and locking parts to a predetermined distance, resilient spacing means respectively associated with each of said wedges and disposed to the rear thereof in engagement therewith and with said second member, said spacing means individually yieldingly spacing said wedges from said second member in the general direction of said relative movement of advance of said last-mentioned die member for urging said wedges to their respective locking positions as aforesaid incident to said relative movement of rapprochement between said member and locking parts, thereby to insure substantially uniformly firm seating in locking position of all of said wedges; and operating means connected on one side to said second member and on the other side to said locking parts which are complementary to said locking parts with which said wedges are associated as aforesaid for actuating said die members and said locking means.

EMANUEL WITTLIN.

REFERENCES CITED

The following references are of record in the file of this patent:

UNITED STATES PATENTS

| Number | Name | Date |
|---|---|---|
| 1,583,576 | Coburn | May 4, 1926 |
| 1,841,490 | Maynard | Jan. 19, 1932 |
| 2,248,461 | Pack | July 8, 1941 |
| 2,268,949 | Lehmann | Jan. 6, 1942 |
| 2,298,043 | Dinzl | Oct. 6, 1942 |
| 2,309,460 | Lester | Jan. 26, 1943 |
| 2,319,479 | Ryder | May 18, 1943 |
| 2,371,547 | Rosenlund et al. | Mar. 13, 1945 |
| 2,492,259 | Beuscher | Dec. 27, 1949 |
| 2,501,536 | Orr | Mar. 21, 1950 |
| 2,526,918 | Wilberschied | Oct. 24, 1950 |